United States Patent
Heyl

[15] 3,664,128
[45] May 23, 1972

[54] POWER TRANSMISSION WITH INTERNAL POWER DISTRIBUTION

[72] Inventor: Walter Heyl, Klein Umstadt, Germany

[73] Assignee: Linde A. G., Hoelbriegelskreuth, Germany

[22] Filed: Jan. 7, 1971

[21] Appl. No.: 104,581

[30] Foreign Application Priority Data

Jan. 7, 1970 Germany.....................P 20 00 797.0

[52] U.S. Cl. .............................................60/53 A, 74/720
[51] Int. Cl.......................................................F16h 39/46
[58] Field of Search ..................................60/53 A; 74/720

[56] References Cited

UNITED STATES PATENTS 3,131,580  5/1964  Forster...................................60/53 A
3,609,973  10/1971  Nagano et al..........................60/53 A Primary Examiner—Edgar W. Geoghegan
Attorney—Millen, Raptes & White

[57] ABSTRACT

This invention relates to a power transmission with a drive shaft and with an output shaft, and with branched internal power distribution consisting of a direct branch for transmission of mechanical drive and a hydrostatic power transmission in a power branch. The hydrostatic power transmission consists of a primary swash plate unit and a secondary swash plate unit which are disposed coaxially with respect to each other and rest against a common symmetrical control element.

10 Claims, 8 Drawing Figures

INVENTOR
WALTER HEYL

BY *Millen, Raptes & White*

ATTORNEYS

INVENTOR
WALTER HEYL

BY *Millen, Raptes & White*

ATTORNEYS

INVENTOR
WALTER HEYL

3,664,128

POWER TRANSMISSION WITH INTERNAL POWER DISTRIBUTION

BACKGROUND OF THE INVENTION

Transmissions having branched power distribution exhibit the advantage that, at least in certain operating conditions, at least part of the power if not transmitted hydraulically, i.e., it is not transmitted via the working fluid from the primary unit to the secondary unit, but, rather, is transmitted directly mechanically via rotating parts from the drive shaft to the output shaft. Since a higher degree of efficiency is attained in mechanical energy transmission than in the hydrostatic energy transmission, it is possible to obtain, by means of such branched power distribution transmissions, a degree of efficiency which is higher, in total, than with the use of purely hydrostatic power distribution transmissions, especially since operating conditions unfavorable for the hydrostatic transmission section can be extensively avoided. However, this is true for a specific transmission arrangement only for a certain operating range, i.e., either for speed-increasing transmissions ($i < 1$) or for speed-reduction transmissions ($i > 1$) [where $i$ is the gear ratio]. In the other operating condition, a so-called flow of reactive power occurs in each case, wherein energy flows from the output shaft along a power branch back to the drive shaft, so that the transmission is under the adverse effect of the load of this cycle of reactive power and efficiency is decreased.

It is customary to speak, in connection with a hydrostatic power transmission, of a pump and a hydraulic motor. However, when, in a hydrostatic transmission, power flows back from the output shaft to the drive shaft, these two units reverse their functions, i.e., the unit designated as the motor has the effect of a pump and conveys fluid to the unit called a pump which, in this case, has the effect of a motor. In order to avoid any misunderstanding which could possibly arise by such exchanges of function, the two hydraulically connected units of the hydrostatic power transmission will be designated hereinbelow as the primary power unit and the secondary power unit, wherein the primary unit is characterized by the feature that it is associated with the drive shaft. In a corresponding manner, the secondary unit is associated with the output shaft. Since the drive shaft and the output shaft are unequivocally defined from the function of the transmission, the two units are thus likewise clearly defined.

The units used herein are commonly known as swash plate units of the type wherein a relatively rotatable cylinder drum and swash plate longitudinally reciprocate pistons in the drum to displace fluid from cylinders or are relatively rotated by the reciprocating pistons actuated by fluid under pressure depending upon the function of the unit as discussed above. The angular disposition of the swash plate is variable through a control element, as is known in the art, to increase or decrease the volume of fluid displaced from the cylinders or to vary the relative rotational speed of the elements.

SUMMARY OF THE INVENTION

The invention is directed to the problem of providing a power transmission with internal power distribution or branching with a hydrostatic transmission in one power branch which operates, at least within a defined operating range, without reactive power at a particularly favorable degree of efficiency.

The invention further provides a hydrostatic transmission through which power is internally branched by furnishing a device having hydraulically interconnected primary and secondary power units, each including a relatively rotatable cylinder drum with plural pistons reciprocating therein and a relatively rotatable swash plate in driving cooperation with the pistons, the units also being mechanically interconnected through a common control unit which has a relatively rotatable element which is connected to rotate with the swash plates.

For this purpose the invention also provides a transmission in which the relatively rotatable element of one of the units is spatially fixed while the relatively rotatable elements of the remaining units are connected to the drive and output shafts, respectively.

Further, according to the invention, the cylinder drum of one of the two hydrostatic power units is disposed to be spatially fixed and the cylinder drum of the other hydrostatic power unit is connected to one of the two shafts, the two swash plates and the symmetrical control element being connected to the other shaft.

Various possible designs can be provided for such a power transmission. One such design, according to a further development of the invention, is obtained by providing that the fixed cylinder drum is the drum of the primary unit, and the cylinder drum of the other hydrostatic unit is joined to the output shaft, with the two swash plates and the symmetrical control element connected to the drive shaft.

Two further designs can be derived, one of which has the drive shaft centrally arranged in the transmission, with the cylinder drum of the secondary unit connected to a rotating housing, preferably an inner housing, which latter, in turn, is fixedly joined to the output shaft. This transmission thus is a hydrostatic power transmission with two axial piston-swash plate units arranged coaxially with respect to each other, the cylinder drums of which rest against a common symmetrical control element, the latter being fixedly connected to a shaft. The swash plates of the two axial piston units are connected to the last-mentioned shaft for rotation therewith, and the cylinder drum of the second swash plate unit is fixedly disposed, wherein the shaft connected with the symmetrical control body and the two swash plates are the drive shaft, and the cylinder drum disposed on the drive end of the transmission constitutes the fixedly disposed cylinder drum.

Another further development of the transmission results from arranging the symmetrical control element and the two swash plates in a rotating housing, which latter, on the one hand, is mounted on a stationary shaft to which the cylinder drum of the primary unit is fixedly connected and, on the other hand, is mounted to the output shaft fixedly connected to the cylinder drum of the secondary unit.

Another embodiment of the transmission mentioned hereinabove can be obtained by providing that the fixedly disposed cylinder drum is the cylinder drum of the secondary unit, and the cylinder drum of the other swash plate unit, i.e., that of the primary unit, is connected with the drive shaft, wherein the two swash plates and the symmetrical control element are connected to the output shaft. Such a transmission has so-called differential-hydraulic transmission function. This transmission is suitable for speed reductions. In this transmission, in the hydrostatic branch, maximally the power supplied thereto is transmitted. This transmission can also effect speed increase, insofar as the technical data of the primary unit and of the secondary unit permit these units to receive the power flowing in the hydrostatic branch wherein, however, a flow of reactive power occurs.

A special design of this transmission is obtained by providing that the secondary unit encompasses the drive shaft, and the symmetrical control element is connected with a rotating housing, preferably an inner housing, the latter encompassing the primary unit.

Particular further developments of the invention are based on the task of making the transmission shiftable in such a manner that, depending on the shifting condition, it is optimally suitable for speed reduction transmission as well as for speed increase transmissions.

In order to solve this problem, the symmetrical control element and the two swash plates are connected, according to a further embodiment of this invention, with a rotating housing. This housing is supported on both sides by a shaft, which latter is respectively fixedly connected with one cylinder drum, wherein each of these two shafts can be selectively either fixedly braked or connected to the output shaft, wherein, whenever one of the shafts is locked by the brake, the other shaft must be connected to the output shaft. For this purpose, it is possible to have an operating member for a brake and an operating member for a clutch effecting connection with the output shaft to be in operative connection with each other, so that when one component is fixed by the brake, it is detached from the output shaft by its clutch, and vice versa. Suitably, the operating members for both brakes and for both clutches are in operative connection with one another so that, upon release of one of the brakes, the other brake is applied, and the clutches are shifted accordingly.

In another further development of the transmission according to this invention, likewise serving for solving the problem disclosed herein, the cylinder drum of the primary unit is connected with the drive shaft by means of a rotary housing fixedly connected therewith and the cylinder drum of the secondary unit is the cylinder drum which is spatially fixedly arranged, namely, by being locked by a brake. The symmetrical control element and the two swash plates are connected to a shaft centrally disposed in the transmission, this shaft being connected with the output shaft. The connection between the output shaft and the central shaft is releasable, the central shaft being selectively fixable in position by means of a brake. The above-mentioned brake for fixing the disposition of the cylinder drum of the secondary unit is selectively releasable, and this cylinder drum is also connectable with the output shaft. Furthermore, in this case, it is advantageous to provide operative connection for at least one pair of the operating members for the two brakes and the two clutches, for alternate engagement in the above-described manner.

The present invention and the function thereof will be explained in greater detail below with reference to the drawings wherein like components throughout the figures thereof are indicated by like numerals and wherein:

DESCRIPTION OF THE PREFERRED EMBODIMENTS

Figure 1:
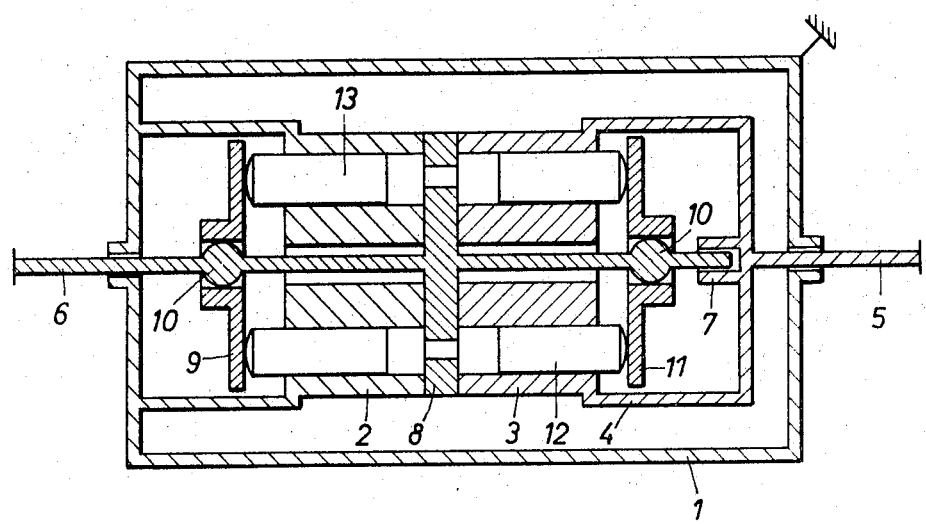
FIG. 1 is a schematic view of a transmission in accordance with the present invention.

In the embodiment shown in FIG. 1, a transmission housing 1 is spatially fixed and is integrally connected with a cylinder drum 2 of a primary unit. A cylinder drum 3 of a secondary unit is connected, via a partial housing 4, to an output shaft 5. A drive shaft 6 is rotatably supported, on the one hand, in the housing 1 and, on the other hand, in a bearing member 7 of the partial housing 4. A symmetrical control element 8 is fixedly connected to the drive shaft 6. A swash plate 9 of the primary unit is connected to the drive shaft 6 by way of a joint 10 in such a manner that the plate is rotated by the drive shaft 6, but that the angle of inclination thereof is selectively adjustable with respect to the drive shaft 6. Correspondingly, a swash plate 11 of the secondary unit is connected, by way of an identical joint 10, to the drive shaft 6 so that it is rotatable therewith but adjustable with respect to its inclination.

Since the swash plate 11 rotates with the drive shaft 6 due to the inclination of the inclined plate 11, lateral forces are transmitted to the pistons 12, by way of the forces exerted by these pistons 12 of the secondary unit on the swash plate 11. These lateral forces are then transmitted as peripheral forces to the cylinder drum 3 of the secondary unit and thus to the output shaft 5. Accordingly, a purely mechanical power flow between the drive shaft 6 and the output shaft 5 is obtained. On the other hand, the swash plate 9, driven by the drive shaft 6, moves the pistons 13 of the primary unit; thus, working fluid is forced to the secondary unit and thus a portion of the power is transmitted in a purely hydrostatic manner as is known in the art.

Figure 1A:
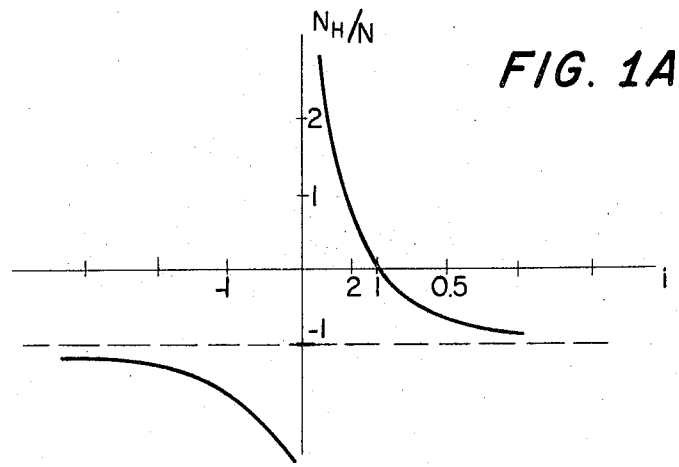
FIG. 1A is a diagram of the ratio of the power transmitted in the hydrostatic branch to the total power (NH/N) as a function of the gear ratio ($i$) of the transmission of FIG. 1.

In the diagram of FIG. 1A the gear ratio $i$ is plotted, as the abscissa, starting with its maximum value toward both sides, and the relationship of the power transmitted in the hydrostatic branch to the total power is indicated as the ordinate. The transmission function of this transmission is represented in the diagram by two branches asymptotically approaching the power ratio minus 1 with decreasing $i$, and asymptotically approaching the ordinate with increasing $i$, wherein the branch disposed on the positive side intersects the abscissa at the value of $i = 1$. This transmission function is called integral-hydraulic. This transmission is suitable for speed increase. For speed reduction, the transmission is only usable insofar as the power transmitted in the hydrostatic branch corresponds to the constructional data of primary unit and secondary unit.

Figure 2:
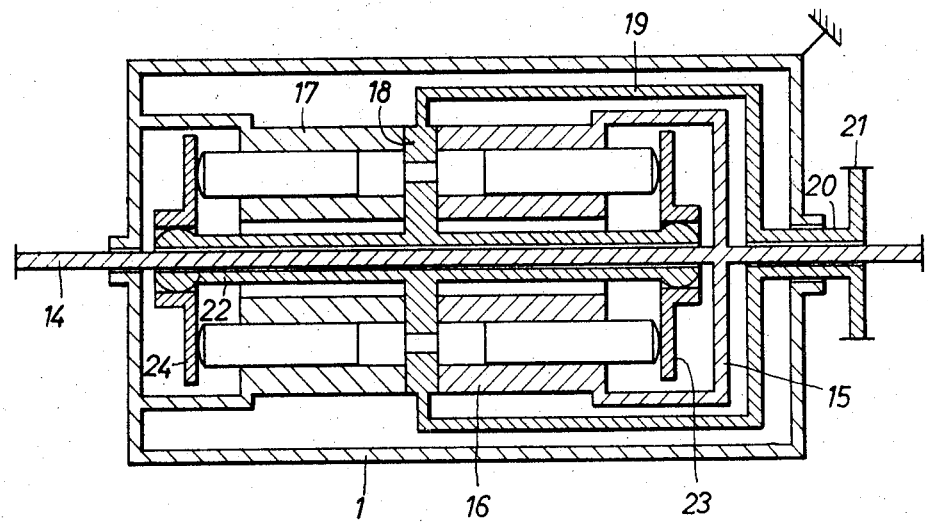
FIG. 2 is a view similar to FIG. 1 of another embodiment of the invention.

In FIG. 2, the stationary housing 1 is the same as in FIG. 1, however, a cylinder drum 17, which is fixedly connected to the housing 1 in the same manner as the drum 2 in FIG. 1, constitutes the cylinder drum of the secondary unit. The drive shaft 14 passes centrally through the power transmission and is fixedly connected to an inner housing 15, the latter, in turn, being fixedly connected to a cylinder drum 16 of the primary unit. A symmetrical control element 18 is fixedly joined to an inner rotary housing 19, which latter is fixedly connected to a hollow shaft 20. An output gear 21 is fixedly arranged on the hollow shaft. The symmetrical control element 18 is furthermore fixed on a hollow shaft 22. A swash plate 23 for the primary unit and two swash plates 24 for the secondary unit are each connected with this hollow shaft 22 for rotation therewith, but with an adjustable inclination.

Figure 2A:
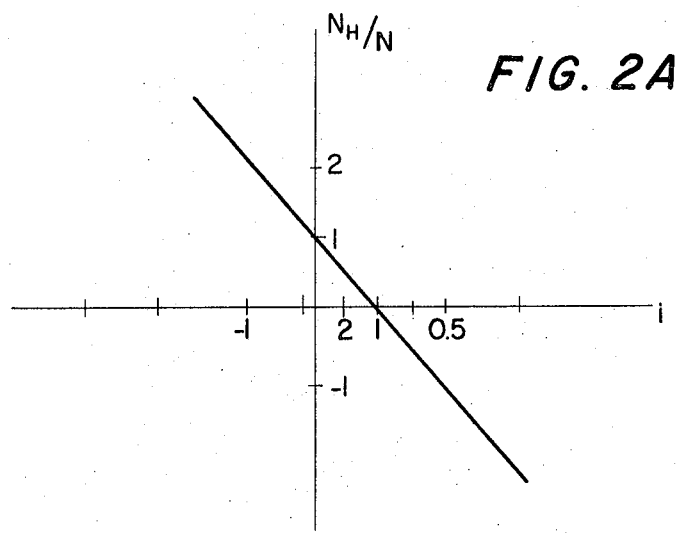
FIG. 2A is a view similar to FIG. 1A for the embodiment of FIG. 2.

In the diagram of FIG. 2A the transmission function is represented by a straight line intersecting the abscissa as well as the ordinate, in each case, at the positive value 1.

In this embodiment, various possibilities arise with respect to the drive shaft 14; for example, this shaft need not be extended, as illustrated in the drawing, out of the housing on both sides, but rather can be merely extended toward the right-hand side as seen in the drawing through the hollow shaft 20, or only toward the left-hand side of the drawing. In the latter case, the shaft 20 need not be a hollow shaft, but can be an output shaft which is directly connected, by means of a flange, with the further extending output shaft. In such case, it will be advantageous to support the drive shaft 14 in the housing 19 in a similar manner as is done in FIG. 1 in connection with the shaft 6 in the bearing member 7 of the housing 4.

Figure 3A:
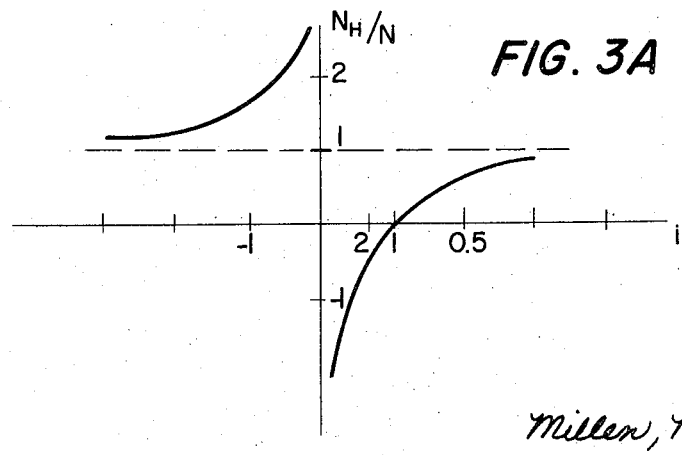
FIG. 3A is a view similar to FIG. 1A for the embodiment of FIG. 3.
Figure 3:
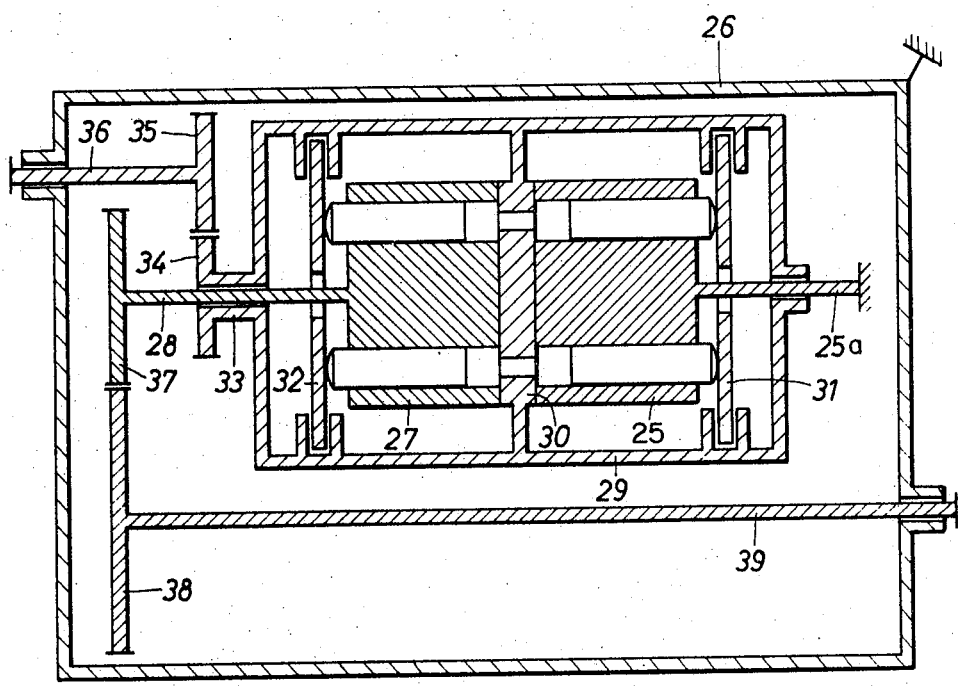
FIG. 3 is a view similar to FIG. 1 of another embodiment of the invention.

In the power transmission shown in FIG. 3, a cylinder drum 25 for the primary unit is fixedly supported by a king pin 25$a$, which latter, in turn, is rigidly connected with a fixed housing 26. A cylinder drum 27 for the secondary unit is fixedly connected to a shaft 28, the latter being rotatably supported in the housing 26 in a manner not shown in detail in the drawing. An inner housing 29 is rotatably supported, on the one hand, on the king pin 25$a$ and, on the other hand, on the shaft 28. A symmetrical control element 30 is rigidly joined to the inner housing 29. A swash plate 31 for the primary unit is mounted to be pivotable about an axis lying in the plane of the drawing within the inner housing 29, but is disposed in such a manner that it rotates with the housing 29 about the common axis of the king pin 25$a$ and of the shaft 28. In a corresponding manner, a swash plate 32 for the secondary unit is selectively inclinable in the inner housing, but is connected with respect to the inner housing 29 so that it can rotate therewith. A hollow shaft 33 is connected to the inner housing 29, a gear 34 being fixedly arranged on this shaft. The gear 34 meshes with a gear 35 disposed on a drive shaft 36. A gear 37 is fixedly connected to the shaft 28, this gear meshing with a gear 38, the latter being arranged on an output shaft 39.

For the drive unit and the driven [output] unit, there are, of course, also further possibilities. For example, the output unit can be extended toward the left out of the housing 26 coaxially to the shaft 28, and the drive unit of the inner housing 29 can be operated by way of a gear arranged on the opposite side of the housing 26.

In the diagram of FIG. 3A a representation similar to FIG. 1A is obtained for the transmission function of this power transmission, but wherein, with decreasing $i$, the branches approach asymptotically the positive value 1 for the power transmission ratio. This transmission is likewise suitable for speed increases.

Figure 4:
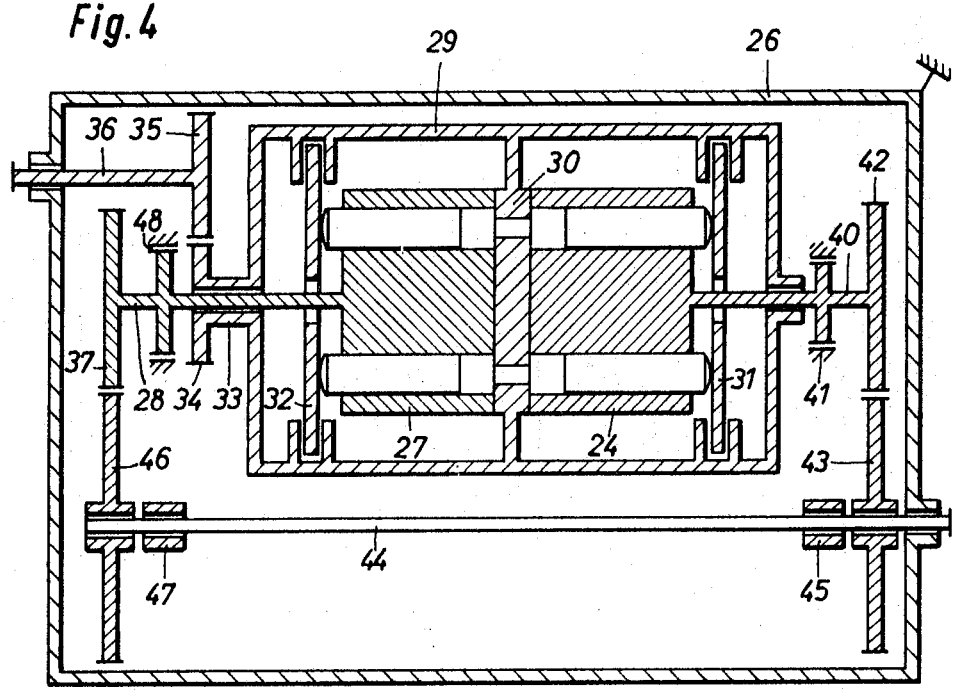
FIG. 4 is a view similar to FIG. 1 of still another embodiment of the invention.

In the power transmission according to FIG. 4, the difference resides in the fact that the cylinder drum 24 is fixedly joined to a shaft 40, which shaft is arbitrarily fixed in position by the brake 41, i.e., the spatially fixed positioning of the cylinder drum 24 of the primary unit can be released at will. Furthermore, a gear 42 is connected to the shaft 40, a gear 43 meshing therewith. The gear 43 is rotatably mounted on an output shaft 44 and can be connected with this shaft by a selectively engageable clutch 45. Correspondingly, the gear 37 meshes with a gear 46, which latter is likewise rotatably disposed on the output shaft 44 and is connectible therewith by a clutch 47. A selectively releasable brake 48 is furthermore arranged on the shaft 28.

If the brake 41 is locked and the clutch 45 is disengaged, and the brake 48 is released and the gear 46 is connected to the output shaft 44 by the clutch 47, exactly the same function is obtained as in the power transmission according to FIG. 3. Due to the structure which is symmetrical with respect to the mirror-image control element 30, the same function is also attained, in principle, if the brake 41 is released and the gear 43 is connected with the output shaft 44, and the brake 48 is locked and clutch 47 is disengaged. Since, however, the gear teeth ratio of the gears 42 and 43 is different from that of gears 37 and 46, it is possible to select, depending on the chosen shifting condition, another associated transmission speed. A further shifting possibility (not illustrated in the drawing) would be obtained if the rotary housing 29 were selectively connectible with the output shaft 44, and the shaft 28 or 40 which is not respectively locked by one of the brakes 48 or 41 were connectible selectively with the drive shaft 36.

Figure 5:
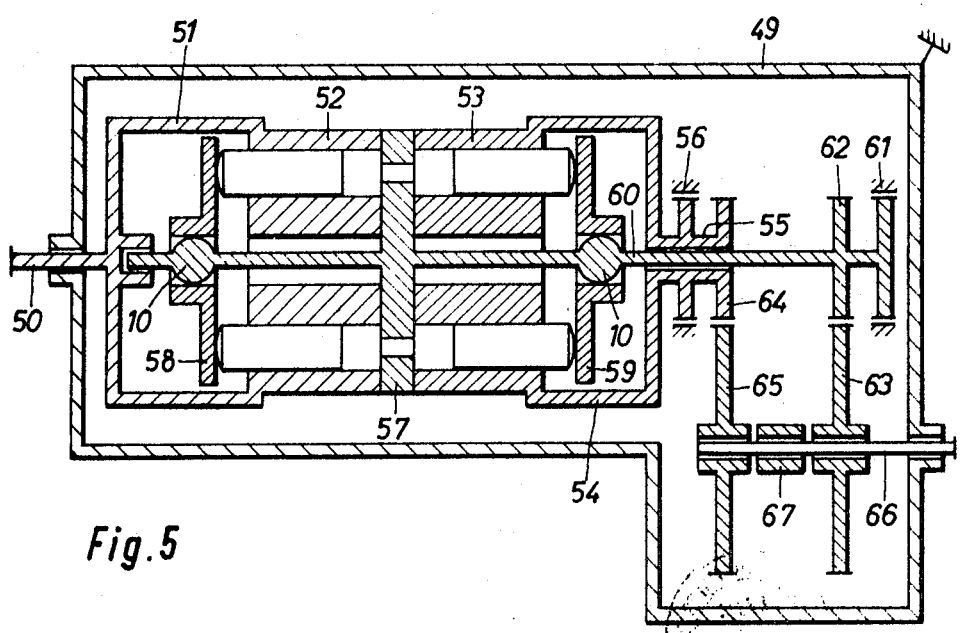
FIG. 5 is a view similar to FIG. 1 of yet another embodiment of the invention.

The power transmission according to FIG. 5 is disposed in a housing 49 which is spatially fixed. A drive shaft 50 is fixedly connected to a cylinder drum 52 for the primary unit via an intermediate housing 51. This represents the only fixed association in this power transmission. A cylinder drum 53 for the secondary unit is connected, via a rotary housing 54, with a hollow shaft 55, the latter being lockable by means of a selectively releasable brake 56. Thereby, the cylinder drum 53 of the secondary unit is a spatially stationary cylinder drum at least in one shifting condition of the power transmission. A symmetrical control element 57, the swash plate 58 of the primary unit, and the swash plate 59 of the secondary unit are connected to a shaft 60, wherein the swash plates 58 and 59 are again joined to the shaft 60 by means of a joint 10 permitting an arbitrary change of inclination but establishing a connection for rotation with the shaft. The shaft 60 can be fixedly disposed by way of a selectively releasable brake 61. A gear 62 is fixedly arranged on the shaft 60, this gear meshing with a gear 63. A gear 64 is fixedly connected with the hollow shaft 55, this latter gear meshing with a gear 65. The two gears 63 and 65 are rotatably mounted on an output shaft 66. One of the two gears 63 or 65 can be alternately connected, by means of a clutch 67, with the output shaft 66 while, alternately, one of the brakes 56 or 61 is locked. If the brake 61 is locked, the gear 65 is connected to the output shaft 66 by the clutch 67. If the brake 56 is locked, the gear 63 is connected, via the clutch 67, to the output shaft 66. If, in the final configuration, the brake 56 is locked, the gear 63 is connected to the shaft 66, and the latter is operated as the drive shaft, and the shaft 50 is operated as the output shaft, the power transmission according to FIG. 5 has the same function as the transmission according to FIG. 1. If the shaft 50 is the drive shaft, and the shaft 66 is the output shaft, as described above, and if the brake 56 is applied in the manner described above, the function of the power transmission corresponds at least substantially to the function of the transmission according to FIG. 2, but wherein the constructional solution with respect to the association to the hollow shaft and to the inner shaft is different.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A power transmission having a drive shaft and output shaft with internal power distribution paths therebetween including a hydrostatic transmission in one path, the hydrostatic transmission comprising hydraulically interconnected primary and secondary power units, each including a relatively rotatable cylinder drum having plural pistons axially reciprocal therein and a relatively rotatable swash plate in driving cooperation with said pistons, and a control unit including a relatively rotatable control element rotationally interconnecting said swash plates, the relatively rotatable element of one of said units being spatially fixed and the relatively rotatable elements of the remaining units being connected to said drive and output shafts, respectively.

2. A power transmission according to claim 1 wherein said spatially fixed element comprises the cylinder drum of one of said power units.

3. Power transmission according to claim 2 wherein said spatially fixed element is the cylinder drum of said primary unit, the cylinder drum of said other power unit being connected to said output shaft, said swash plates being connected to said drive shaft.

4. Power transmission according to claim 3 wherein said drive shaft is centrally disposed in said transmission, and the cylinder drum of said secondary unit is connected to said output shaft by means of a rotary housing.

5. Power transmission according to claim 3 wherein said control element and swash plates are disposed within a rotating housing, said housing being rotatably supported at one end by a coaxially disposed spatially fixed unit to which the cylinder drum of said primary unit is fixedly connected, and, on the other end by said output shaft to which the cylinder drum of the secondary unit is fixedly connected.

6. Power transmission according to claim 2 wherein said control element and swash plates are connected to a rotating housing supported on both ends by shafts fixedly connected to the cylinder drums of said power units, each of said last referred to shafts being selectively and alternately either braked to be spatially fixed or connected to said output shaft.

7. Power transmission according to claim 2 wherein said spatially fixed cylinder drum is the cylinder drum of said secondary unit, the cylinder drum of said other power unit being connected to said drive shaft, said swash plates and control element being connected to said output shaft.

8. Power transmission according to claim 7 wherein said secondary unit encompasses said drive shaft, and wherein a rotary housing encompassing the primary unit connects said control element and output shaft.

9. Power transmission according to claim 2 wherein the cylinder drum of said primary unit is connected to said drive shaft by means of a rotary housing, and comprising brake means selectively spatially fixing the cylinder drum of said secondary unit, a centrally arranged shaft connecting said control element and swash plates, clutch means selectively connecting said centrally arranged shaft to said output shaft, and brake means for selectively spatially fixing said centrally arranged shaft and clutch means for selectively connecting the cylinder drum of said secondary unit to said output shaft.

10. Power transmission according to claim 9 further comprising actuating members for said clutch and brake means and wherein an actuating member for at least one of said brake means and an actuating member for at least one of said clutch means are connected to each other for simultaneous actuation thereof.

* * * * *